United States Patent Office.

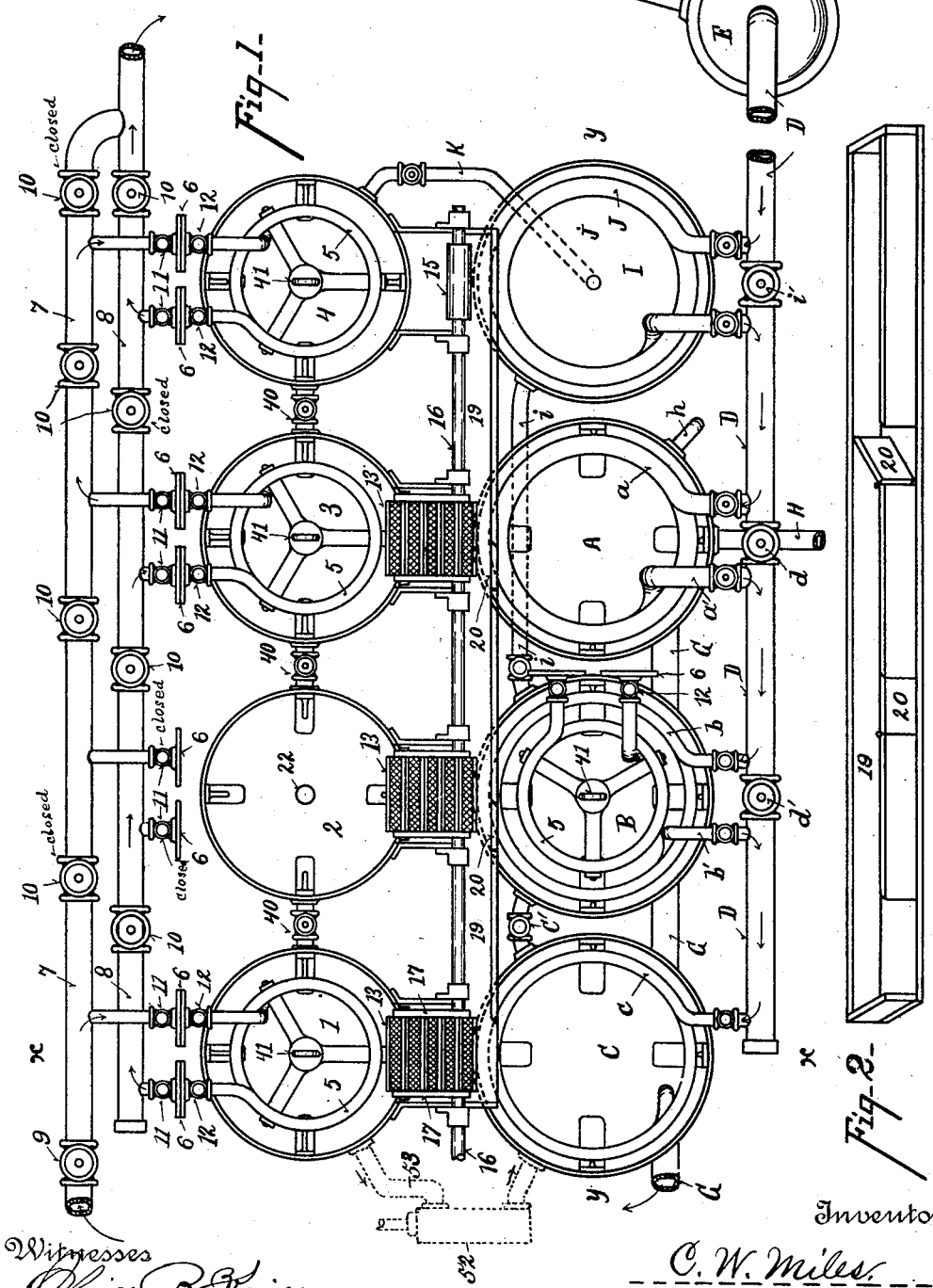

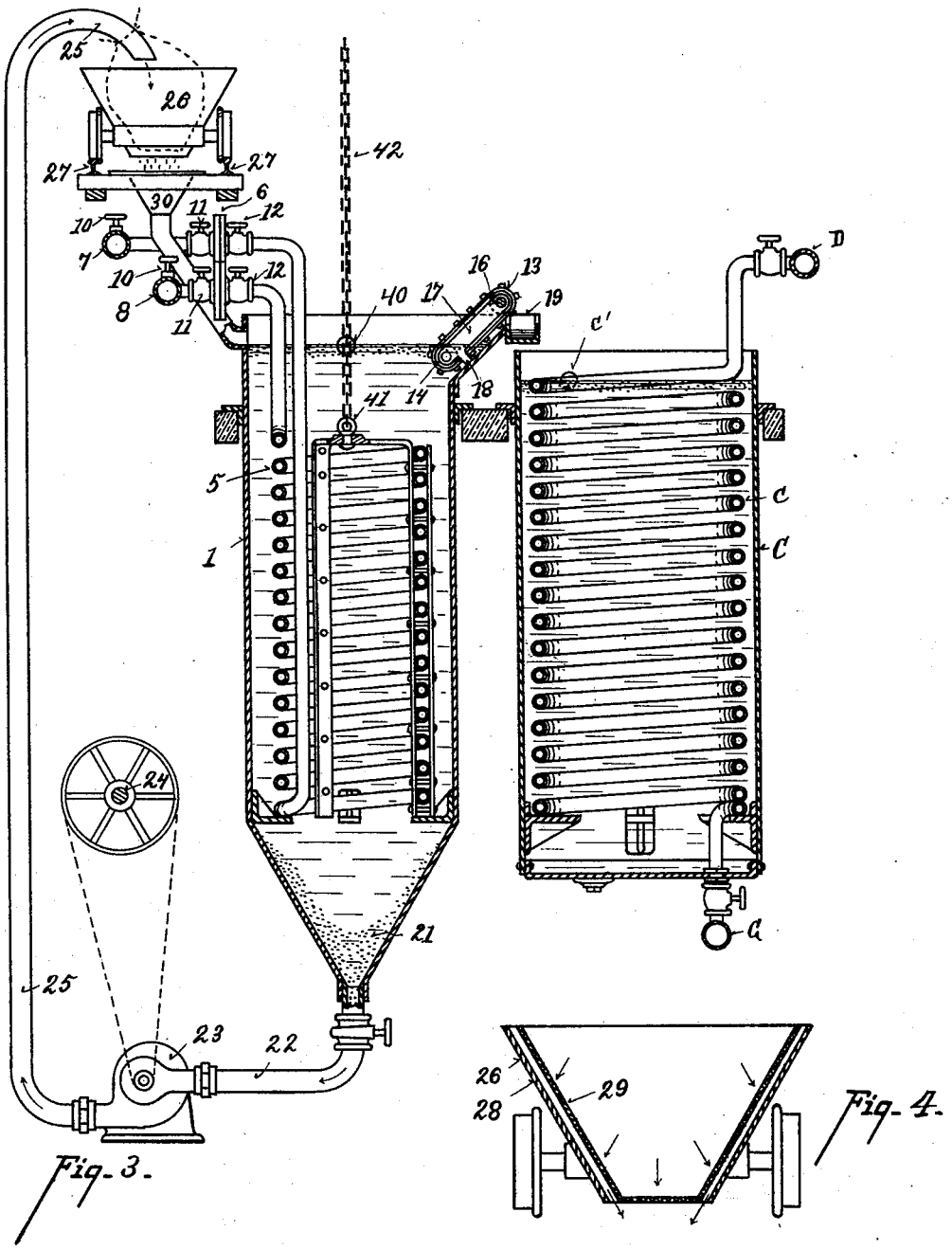

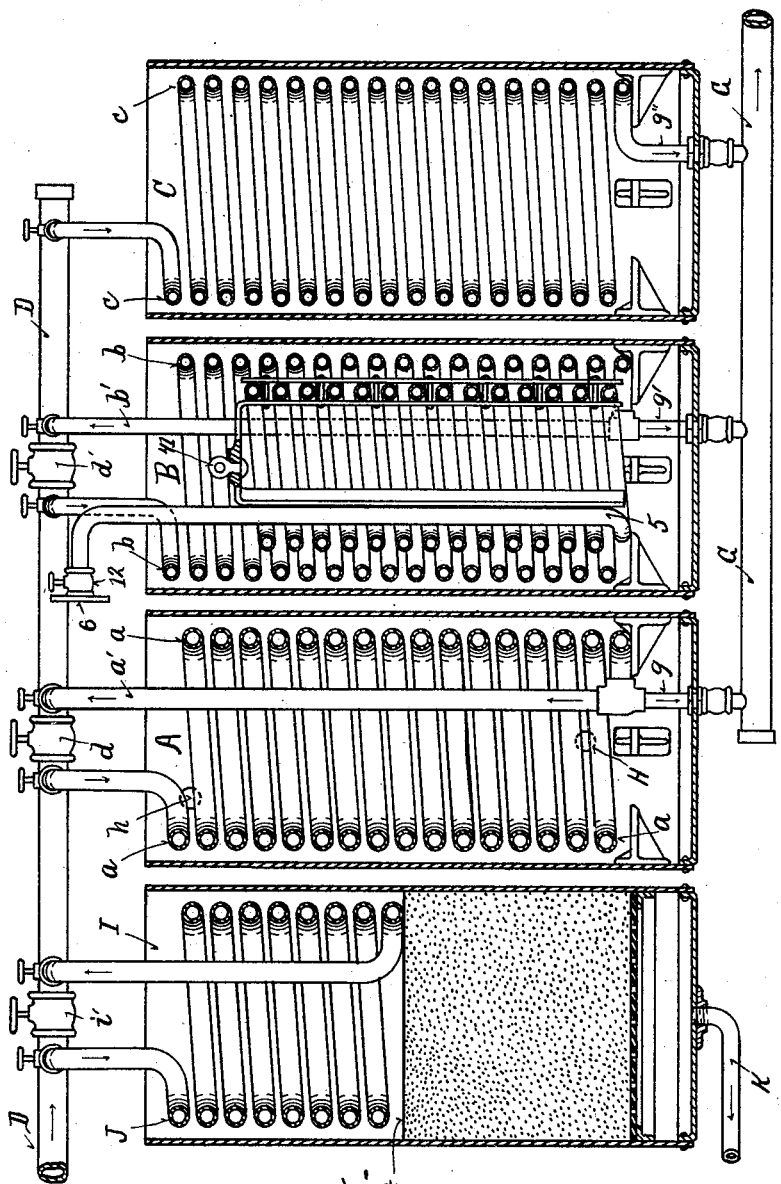

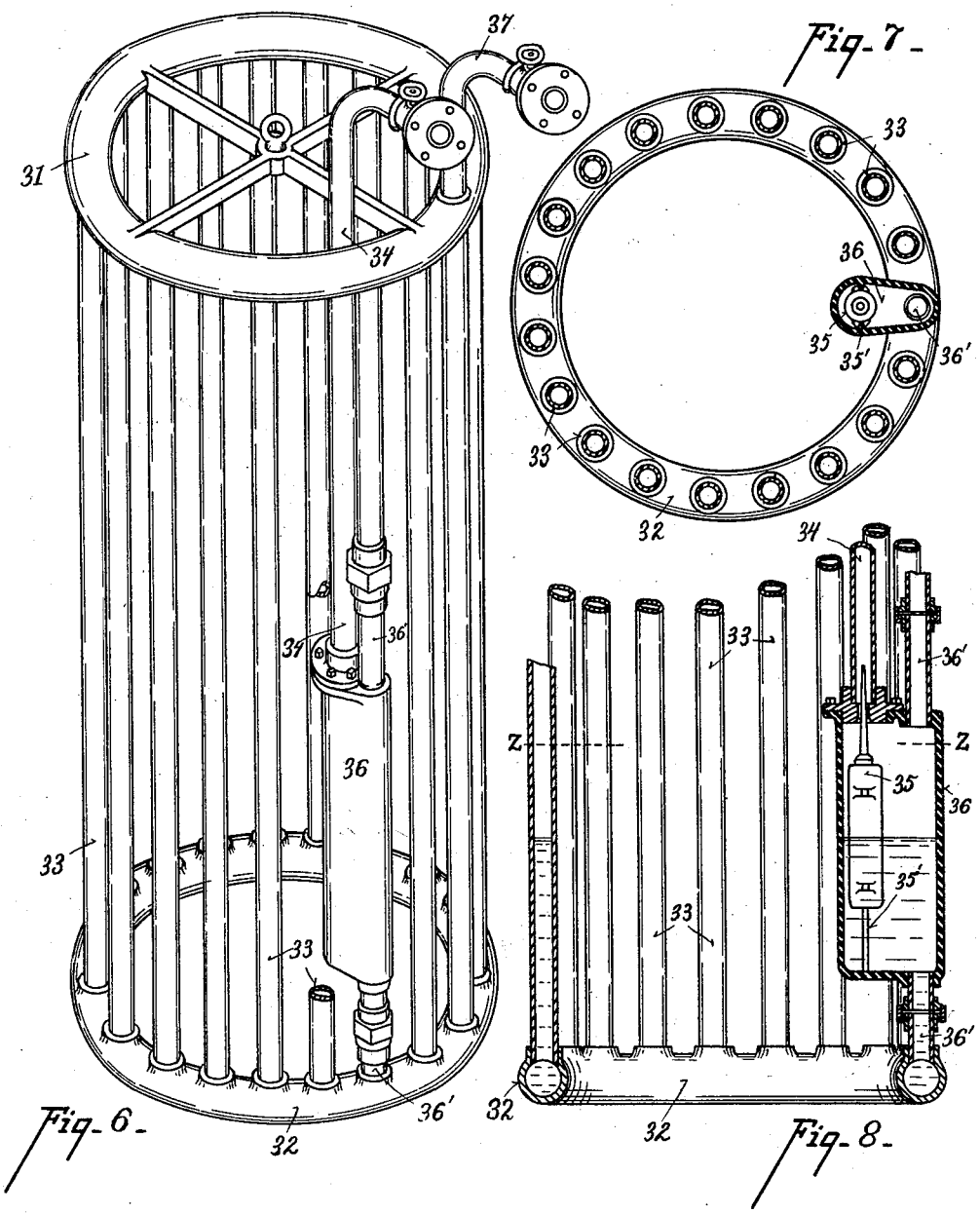

CASPER W. MILES, OF CINCINNATI, OHIO.

PROCESS OF AND APPARATUS FOR REFINING OR CRYSTALLIZING SOLUBLE CRYSTALLINE SUBSTANCES.

SPECIFICATION forming part of Letters Patent No. 633,206, dated September 19, 1899.

Application filed January 31, 1898. Serial No. 668,523. (No model.)

*To all whom it may concern:*

Be it known that I, CASPER W. MILES, a citizen of the United States, residing at Cincinnati, in the county of Hamilton and State of Ohio, have invented certain new and useful Improvements in Processes of and Apparatus for Refining or Crystallizing Soluble Crystalline Substances, of which the following is a specification.

My invention relates to improved processes of and apparatus for crystallizing and purifying various salts and crystalline substances.

One of its objects is to provide improved means for crystallizing a single salt, as sodium chlorid or sodium carbonate, from its solution in water.

Another object is to provide means for separating two or more different salts from each other.

My invention also consists in several detail improvements in apparatus adapted for carrying on my said process, all of which will be more fully set forth in the description of the accompanying drawings, forming a part of this specification, in which—

Figure 1 is a diagram of my apparatus in top plan view. Fig. 2 is a detail view of the ice-chute. Fig. 3 is a section on line $x\, x$, Fig. 1. Fig. 4 is a central vertical section through the salt-car. Fig. 5 is a section on line $y\, y$, Fig. 1. Fig. 6 is a perspective view of a modified form of refrigerating-coil. Fig. 7 is a section through the same on line $z\, z$, Fig. 8. Fig. 8 is a central vertical section of Fig. 7.

It has been the general practice heretofore in crystallizing salts to volatilize the water in which they were dissolved, leaving the salt behind. This requires a large consumption of fuel and considerable labor, and it is not a satisfactory method for separating two or more salts which may be contained in the same solution. In my improved process I employ a refrigerating-machine, by means of which the brine or solution is cooled in a series of tanks until the salt crystallizes out or the water of the solution is congealed and removed from the solution as ice, while the salt or salts are precipitated and fall to the bottom of tanks, and where two or more salts are contained in the solution the temperature and density of the brine is so regulated and maintained as to deposit all or nearly all of one salt in one tank, another in another, &c., thereby readily separating one or more salts from another or a given salt from its impurities.

In the accompanying drawings, 1, 2, 3, and 4 represent tanks or receptacles for the brine or solution to be crystallized. 5 represents refrigerating-coils submerged therein and detachably connected, preferably by means of flanged unions 6, with lead pipes 7 8, through which the refrigerant is introduced into and carried away from the refrigerating-coils. 9, 10, 11, and 12 represent valves so arranged as to enable any one of the said several refrigerating-coils to be detached or cut out of circuit without interfering with the operation of the remaining coils and also to enable the said several coils to be connected up in tandem series, as indicated by the arrows in Fig. 1, or in parallel series or partly in each way, as desired. By means of this arrangement the brine or solution in the several tanks can be accurately controlled as to temperature and the several refrigerating-coils can be removed when they become coated with ice and the ice removed, preferably by immersing the said coil in one of the condenser-tanks A B C.

Another portion of the ice formed in the brine or solution rises in small detached crystals to the surface of the solution, from whence it is automatically removed by means of endless screen belts or aprons traveling over rollers 14 15 and driven by means of shaft 16, on which the rollers 15 are mounted, rollers 14 being journaled in the end of links 17, which are strung upon shaft 16.

18 represents feet or stops on which the free end of the links are supported against the inner face of the tank.

19 represents an inclined chute into which the detached ice is deposited from the aprons B and along which it is conveyed and deposited in one or other of the condenser-tanks.

20 represents gates by means of which the operator can direct the discharge of ice from the trough or chute to the desired condenser-tank.

It is desirable with many salts to control the size or grain of the crystals. This I accomplish, as well as provide a ready means for removing the precipitated salt, in the following manner: The bottoms of the refrigerating-tanks are preferably formed conical or inclined, so as to direct the precipitated salt 21 to a common point. 22 represents a pipe leading from said focus-point to a centrifugal pump 23, there being preferably a pump 23 for each refrigerating-tank, though where one salt only is to be crystallized a common pump may be employed for all the refrigerating-tanks.

24 represents a shaft from which the pumps are driven. 25 represents the outlet-pipe from said pump, which discharges the brine or solution and suspended crystals into a car 26, supported upon a track 27 above the tanks. This car is provided with a conical shell 28, open at the bottom, and a screen-lining 29, upon which the salt-crystals are deposited, while the brine drains from the bottom of the car into a funnel-pipe 30, through which it is conducted back to the refrigerating-tank. In dotted line, Fig. 3, I have shown a sack secured over the end of discharge-pipe 25, which may be employed to separate fine crystals or where it is desired to sack the salt. This method serves to circulate the brine in the refrigerating-tank, thereby assisting the precipitation of salt, and by the removal of the crystals from the tank as soon as formed they are prevented from growing or increasing in size after precipitation.

In Figs. 6, 7, and 8 I have shown a modified form of refrigerating-coil which is adapted for use in the first or first and second refrigerating-tanks, and particularly when low temperatures are desired. This coil consists of an upper and lower ring-pipe 31 32, a series of connecting-pipes 33, an inlet-pipe 34, through which the liquid refrigerant is introduced into the coil, a float-valve 35, guides 35' and float-valve chamber 36, a pipe 36', connecting said valve-chamber with ring-pipes 31 32, and an exit-pipe 37 for the escape of the volatilized refrigerant. By means of this coil I am enabled automatically to supply a considerable quantity of liquid refrigerant on the lower portion of the coil, where it exposes a large surface and is more readily volatilized, the volatile portion rising as soon as formed through the several pipes 33 and escaping, by means of the ring-pipe 31, through the common exit-pipe. By this means I am enabled to volatilize a larger quantity of the refrigerant in the first or coldest of the tanks, which, being circulated successively through the remaining refrigerating-coils, serves to refrigerate them each to a slightly less degree than the preceding one, and thereby makes the process much more economical than it would otherwise be.

In order to utilize the ice formed in the refrigerating-tanks in cooling and condensing the compressed gas in the condensers, I provide a series of condenser-tanks A B C.

D represents the discharge-pipe from the compressor E, through which the gas may be conducted direct to the condenser A, or, as hereinafter described, may be first employed as a heating agent in the filter-tank I. In either case the gas is preferably conducted from pipe D into coil $a$, which it traverses, and is returned to pipe D through pipe $a'$, valve $d$ being closed.

G represents the receiver-pipe, into which that portion of the gas which is liquefied is conducted through branch pipes $g$ $g'$. The uncondensed gas from pipe $a'$ is then introduced through pipe D into coil $b$, which it traverses, and the uncondensed portion passes out pipe $b'$ and is conducted to the coil $c$ in tank C, valve $d'$ being closed, the condensed portion of the gas passing to the receiver-pipe G.

The detached ice is preferably fed to tank C, from which the surplus water overflows through pipe $c'$ into tank B, but may be fed to tanks B C, if desired. Ice is also formed upon the outer surface of the refrigerating-coils, which are from time to time detached from the supply-pipes 7 8 and lifted by means of an eye-bolt 41, chain 42, and suitable traveling crane (not shown) and immersed in one of the tanks B C (see Figs. 1 and 5) until the ice is removed, another coil being substituted in the refrigerating-tank.

In condenser-tank A, I preferably employ surface or well water in liberal quantity to take off the bulk of the heat from the condensed gas, said surface-water being supplied through pipe H and escaped through pipe $h$. The overflow from tanks B C may also be introduced into tank A, if desired, or when tank I is dispensed with.

It frequently happens that the crude salt is obtained in the solid form and has to be first dissolved and then recrystallized, as in the case of rock-salt or crude soda-ash. In such case I provide a dissolving and filter tank I, into which the water from the condenser-tank B is preferably allowed to flow through pipe $i$, being heated therein by the circulation of the hot gas from the compressor through coil J and back to pipe D, valve $i$ being closed. A quantity of crude salt is then placed in the dissolving-tank on the filter-bed $j$. The heated water dissolves the salt to saturation, when upon account of its superior gravity it sinks through the filter-bed and is supplied automatically to the last refrigerator-tank by gravity through pipe K. Where the brine is supplied from springs, lakes, or wells, the dissolving-tank is dispensed with and the brine filtered and introduced direct into the last refrigerating-tank, from which it progresses toward the first refrigerating-tank, the mother liquor being withdrawn from the first tank from time to time as it becomes overcharged with impurities.

The mode of operation is as follows: The brine is supplied from tank I or from a well or other source to refrigerating-tank 4 and from thence through pipes 40, as desired, to the succeeding tanks 3 2 1, each tank being provided with a refrigerating-coil, tank 1 being preferably provided with a coil of the form shown in Figs. 6, 7, and 8. The liquefied gas is introduced from the receiver-pipe G through a valve $g$ to the first refrigerating-coil, from whence it is ordinarily circulated in tandem series through the coils of the several tanks 2 3 4 and thence to the ordinary refrigerator-compressor E. The shaft 16 is slowly rotated, causing the aprons to lift the detached ice from the brine and thoroughly drain it, after which the ice is dropped into the chute 19, which carries it preferably to condenser-tank C. As soon as salt begins to deposit one or more of the pumps 23 may be started, and the salt which has accummulated in the apex of the refrigerating-tank (see Fig. 3) is deposited in the car in which it is preferably removed to a dry-room or centrifugal machine. When a sufficient thickness of ice has been deposited upon any of the refrigerating-coils, it is detached, lifted, and drained and immersed in one of the condenser-tanks B C, another coil being substituted in the refrigerating-tank.

Where two or more salts are contained in one solution, the valves 9 10 11 12 are manipulated by the operator to maintain the desired density and temperature in the successive tanks necessary to deposit one salt in one tank and another in another, depending to a considerable extent upon the salts to be treated, it being necessary in some cases to redissolve and retreat the resultant salts of the first operation in order to effect a perfect separation.

Some salts can be crystallized without carrying the refrigeration to the freezing-point, in which case the saturated solution may be drawn from tank I into the refrigerating-tanks, where its temperature is reduced to near the freezing-point, when a certain per cent. of the salt crystallizes out. The aprons 13 are dispensed with, and the remaining weak solution is transferred, by means of a pump 52 and connecting-pipe 53, (shown in dotted line, Fig. 2,) to the condenser-tank C, from whence it finds its way back to the dissolving-tank, where, being reheated, it dissolves a fresh quantity of salt and is ready to be again circulated through the refrigerating-tanks.

It will be observed that the condenser-tanks A B C act as auxiliaries to the compressor E and assist in liquefying the gas from the compressor at a lower temperature and pressure than ordinarily obtained by utilizing the ice formed in the refrigerating-tanks in the condensers, the gas which comes from the compressor at a high temperature being reduced by successive degrees to a temperature and pressure at which it will readily condense, thereby greatly reducing the amount of power required to drive the compressor.

By means of the apparatus herein shown and described I am enabled to carry out the several processes herein described and to precipitate the different salts in the refrigerating-tanks at such temperatures as are most economical, thus very materially improving the process of treating salts which contain impurities, allowing a complete separation of the impurities from the crystallized salts.

Another very important result accomplished by the process and apparatus herein described is that of controlling the size of the crystals of the salts precipitated in the refrigerator-tanks, this being regulated by the rapidity with which the process is carried on and the length of time the crystals are left in the solution in the refrigerating-tanks.

Having described my invention, what I claim is—

1. The process of refining or crystallizing soluble crystalline substances, which consists in passing a strong solution of the crude substance successively through a series of tanks, and subjecting the said solution to the action of a controllable refrigerant in the several tanks; whereby the substance and its soluble impurities are separately precipitated in successive tanks, substantially as specified.

2. The continuous process of refining or crystallizing soluble crystalline substances, which consists in circulating a strong solution of the salt through a receptacle in which it is subjected to the action of a controllable refrigerant, and refrigerated to near its freezing-point, whereupon a portion of the substance is precipitated; then through a receptacle in which the solution is heated; then into a receptacle in which it is brought into contact with a fresh quantity of the crude substance and filtered; and then transferred again to the refrigerating-tank, substantially as specified.

3. The continuous process of separating and refining from a common solution two or more different crystalline substances, which consists in refrigerating the solution by means of a controllable refrigerant in a series of succeeding tanks to successively-increasing degrees, whereby the different substances are refined and successively precipitated in different tanks, substantially as specified.

4. In a crystallizing apparatus in combination with a gas-compressor, a refrigerating-tank, a refrigerating-coil, and refrigerant-circulating pipes, a dissolving-tank having a condensing-coil located in the upper portion thereof, and connected to said refrigerant-circulating pipes, a filter-bed located in the lower portion of said dissolving-tank, pipe connections from said refrigerating-tank to the top of the dissolving-tank, and from the bottom of the dissolving-tank to the refrigerating-tank, and means for circulating the solution from one of said tanks to the other, substantially as specified.

5. In a crystallizing apparatus, a series of refrigerating-tanks, connecting-pipes connecting said tanks in series, a series of refrigerating-coils submerged respectively in said refrigerating-tanks, and valve-controlled refrigerant supply and discharge pipes, whereby said several coils may be independently controlled and whereby the solution may be subjected to successively-lower temperatures, substantially as specified.

6. In a crystallizing apparatus, a series of refrigerating and crystallizing tanks, valve-controlled connecting-pipes, connecting said tanks in series, refrigerant feed and discharge pipes, a series of refrigerating-coils submerged respectively in said tanks, and valve mechanism whereby said several coils may be independently controlled and whereby the solution may be subjected to successively-lower temperatures, substantially as specified.

7. The process of refining or crystallizing soluble crystalline substances, which consists in passing a solution of the crude substance successively through a series of crystallizing-tanks, through which tanks a controlled refrigerant is circulated, whereby the solution is subjected to successively-lower degrees of temperature and the substance and its soluble impurities separately precipitated in successive tanks, substantially as specified.

8. In a crystallizing apparatus, an artificial refrigerating mechanism embodying a series of refrigerating-tanks, a series of refrigerating-coils located respectively therein, refrigerant-circulating pipes, detachable unions connecting the opposite ends of said coils respectively to said circulating-pipes, shut-off valves upon opposite sides of said unions, and one or more condenser-tanks adapted to receive said detached refrigerating-coils, substantially as specified.

9. In a crystallizing apparatus, a refrigerating-tank means substantially as shown for removing and draining the ice collecting at the surface of said tank, a condenser consisting of a series of tanks, pipes connecting said tanks in series a series of condenser-coils located respectively in said condenser-tanks, and connected in tandem series, and means for supplying said detached ice to the end one of said series of condenser-tanks, substantially as specified.

10. In a crystallizing apparatus an artificial refrigerating mechanism embodying a series of refrigerating-tanks, a series of refrigerating-coils located respectively therein, refrigerant-circulating pipes having individual connections with each of said coils, and means for detaching and bodily removing said refrigerating-coils and closing their branch connections with the circulating-pipes whereby the solution may be subjected to successively-lower temperatures, substantially as specified.

11. In a crystallizing apparatus, an artificial refrigerating mechanism embodying a refrigerating and crystallizing tank, a refrigerating-coil located in said tank and connected at opposite ends to refrigerant-circulating pipes normally connected to said coil, detachable unions connecting the opposite ends of said coil respectively with said circulating-pipes, and shut-off valves located upon opposite sides of each of said unions, substantially as specified.

12. The process of refining and separating two or more crystalline substances from a common solution, which consists in passing the crude solution of the substances in one direction successively through a series of crystallizing-tanks, through which tanks a refrigerant is successively circulated in the opposite direction, whereby the solution is subjected to successively-lower degrees of temperature, and the several substances successively precipitated thereby in separate tanks, substantially as specified.

13. In a crystallizing apparatus, a crystallizing-tank, a refrigerating-coil located therein, a condenser, and a gas-compressor, and pipe connections adapted to circulate the gas through the condenser and refrigerator and back to the compressor; a dissolving and filtering tank, and means substantially as described for circulating the solution to be crystallized through the tanks, whereby a portion of the substance to be refined is precipitated, then over the condenser where the solution is reheated, then through the dissolving and filtering tank where a fresh quantity of the substance is taken up into the solution, and the solution finally filtered and returned to the refrigerating-tank, substantially as specified.

14. A series of refrigerating-tanks, a series of refrigerating-coils located respectively therein, and connected to refrigerant supply and discharge pipes, said coils and pipes being provided with individual valves arranged so as to circulate said refrigerant successively through said several coils, and means for cutting out of circuit or bodily disconnecting any one of said coils without disturbing the circulation through the remaining coils whereby the solution may be subjected to successively-lower temperatures, substantially as specified.

15. In a crystallizing apparatus a series of refrigerating and crystallizing tanks, a series of refrigerating-coils respectively located therein, refrigerant supply and discharge pipes adapted to maintain a continuous circulation of the refrigerant, and means substantially as shown for controlling the circulation of said refrigerant so as to pass it in either tandem or parallel series through said several coils whereby the solution may be subjected to successively-lower temperatures, substantially as specified.

16. In a crystallizing apparatus, a refrigerating and crystallizing tank, refrigerant feed and discharge pipes adapted to maintain a continuous circulation of the refrigerant a refrigerating-coil connected to said feed and discharge pipes and normally submerged in said refrigerating-tank, means for detaching and bodily removing said refrigerating-coil and a condenser having a coil with branch pipe connections to said circulating-pipes, said condenser being adapted to receive the refrigerating-coil when removed from the refrigerating-tank, and melt the ice therefrom, substantially as specified.

17. In a crystallizing apparatus, an artificial refrigerating mechanism embodying a refrigerating and crystallizing tank, refrigerant-circulating pipes, a coil connected to said pipes, located in said tank, and adapted to maintain a continued refrigeration therein; a condenser and dissolving tank provided with a coil connected to said circulating-pipes, in which tank the solution is reheated and charged with a fresh quantity of the substance to be crystallized; and pipe connections between said tanks and means for circulating the solution from one tank to the other, substantially as specified.

18. The combination with a series of refrigerating-tanks, refrigerant-circulating pipes, bodily-removable refrigerating-coils located in said tanks and connected to said circulating-pipes, means for automatically removing, draining and discharging the detached ice collecting at the surface of the solution in said tanks, of a series of condensing-tanks with pipe connections between, a series of condenser-coils, connected to said circulating-pipes, and through which the refrigerant to be condensed is successively circulated, and means for depositing the ice from said several refrigerating-tanks to one of the condenser-tanks, from which it passes successively through said several condensing-tanks, substantially as specified.

19. In combination, a refrigerating and crystallizing tank, a refrigerating-coil located therein and connected at opposite ends to refrigerant-circulating pipes, a series of condenser-tanks, a series of condenser-coils located respectively in said tanks and connected to said circulating-pipes, and means for circulating the refrigerant first through a tank supplied with condensing-water from an extraneous source to remove the bulk of the heat, and then through one or more tanks supplied with ice from said refrigerating-tank, substantially as specified.

20. A refrigerating-coil consisting of a series of parallel pipes, end sections at opposite ends thereof, each forming a common connection between said pipes with a passage from one of said pipes to each of the others, a valve-chamber located between said end sections, an inlet-pipe tapping said valve-chamber, a float-valve located at the mouth of said inlet-pipe, and an exit-pipe tapping the upper end section, substantially as specified.

21. In a crystallizing apparatus, an artificial refrigerating mechanism embodying a series of refrigerating-tanks, a series of refrigerating-coils respectively submerged in said tanks and connected in series, the first of said coils being adapted to hold a considerable quantity of liquefied refrigerant under ebullition, the vapor from which is successively circulated through the several coils and thence to the compressor, substantially as specified.

22. In a crystallizing apparatus, a series of connected refrigerating and crystallizing tanks, a series of refrigerating-coils located respectively therein and adapted to circulate a constant supply of refrigerant, a dissolving-tank and connecting-pipes between said tanks, and means for circulating the crystallizing solution successively through the same whereby the solution may be subjected to successively-lower temperatures, substantially as specified.

23. In a crystallizing apparatus, a refrigerating-tank and automatic ice-feeding mechanism, a condenser consisting of a series of tanks, pipes connecting said tanks in series, a condensing-coil located in each of said condenser-tanks, a drain-pipe leading from each of said condenser-coils to the receiver, and a supply-pipe from the compressor connecting said several condensing-coils in tandem series, substantially as specified.

24. In a crystallizing apparatus the combination of a gas-compressor, a series of condenser tanks and coils, and a series of refrigerator tanks and coils, the interior diameter of the condenser-coils being greater than the exterior diameter of the refrigerator-coils, means for supplying gas from the compressor successively through the condenser-coils and refrigerator-coils back to the compressor, and means substantially as shown for detaching the refrigerator-coils and immersing them in the condensers, substantially as specified.

25. In a crystallizing apparatus, the combination of a compressor, a condenser, a series of connected refrigerating and crystallizing tanks, a refrigerating-coil located in each of said refrigerating-tanks and separately connected to valve-controlled refrigerant-circulating pipes, whereby the contents of said refrigerating-tanks may be refrigerated to successively-increasing degrees, substantially as specified.

26. In a crystallizing apparatus, a crystallizing-tank, a refrigerating-coil submerged therein, a condenser-coil, and a gas-compressor circulating the refrigerant through the condenser and refrigerator coils and back to the compressor, a dissolving-tank, and means substantially as described for circulating the solution from the refrigerating-tank over the condenser-coils to reheat the solution; through the dissolving-tank to dissolve a fresh quantity of the substance to be refined in said solution; and then back to the refrigerating-tank, substantially as specified.

In testimony whereof I have hereunto set my hand.

CASPER W. MILES.

Witnesses:
 W. R. WOOD,
 OLIVER B. KAISER.